United States Patent [19]
Vishakhadatta et al.

[11] Patent Number: 6,078,444
[45] Date of Patent: Jun. 20, 2000

[54] READ CHANNEL AUXILIARY HIGH PRECISION DATA CONVERSION

[75] Inventors: G. Diwakar Vishakhadatta, Austin, Tex.; David E. Reed, Westminster, Colo.; Jerrell P. Hein, Driftwood; G. Tyson Tuttle, Austin, both of Tex.

[73] Assignee: Cirrus Logic, Inc., Fremont, Calif.

[21] Appl. No.: 08/634,161

[22] Filed: Apr. 18, 1996

Related U.S. Application Data

[63] Continuation-in-part of application No. 08/440,515, May 12, 1995, Pat. No. 5,796,535.

[51] Int. Cl.[7] ............................... G11B 5/00; G11B 5/09; H03M 1/12
[52] U.S. Cl. ............................... 360/32; 360/51; 341/155
[58] Field of Search ............................ 360/32, 51, 77.17; 318/138; 341/126, 155

[56] References Cited

U.S. PATENT DOCUMENTS

| | | | |
|---|---|---|---|
| 4,864,437 | 9/1989 | Couse et al. | 360/75 |
| 4,973,976 | 11/1990 | Lee et al. | 341/141 |
| 4,979,055 | 12/1990 | Squires et al. | 360/69 |
| 5,134,606 | 7/1992 | Sekiguchi et al. | 369/116 |
| 5,297,184 | 3/1994 | Behrens et al. | 375/98 |
| 5,321,559 | 6/1994 | Nguyen et al. | 360/46 |
| 5,345,342 | 9/1994 | Abbott et al. | 360/48 |
| 5,384,671 | 1/1995 | Fisher | 360/51 |
| 5,422,760 | 6/1995 | Abbott et al. | 360/46 |
| 5,424,881 | 6/1995 | Behrens et al. | 360/40 |
| 5,459,679 | 10/1995 | Ziperovich | 364/602 |
| 5,497,154 | 3/1996 | Komamura | 341/131 |
| 5,525,984 | 6/1996 | Bunker | 341/131 |
| 5,530,442 | 6/1996 | Norsworthy et al. | 341/131 |
| 5,606,468 | 2/1997 | Kodama | 360/75 |
| 5,638,230 | 6/1997 | Kadlec | 360/78.04 |
| 5,808,574 | 9/1998 | Johnson et al. | 341/110 |
| 5,854,714 | 12/1998 | Reed et al. | 360/77.08 |

OTHER PUBLICATIONS

Welland et al., "Implementation of a Digital Read/Write Channel with EEPR4 Detection," *IEEE Transactions on Magnetics*, 31(2):1180–1185, Mar. 1995.

Welland et al., "Implementation of a Digital Read/Write Channel with EEPR4 Detection," Presentation Slides by Crystal Semiconductor Corporation and Cirrus Logic, TMRC'94.

Cideciyan et al., "A PRML System for Digital Magnetic Recording," *IEEE*, 10(1):38–56, 1992.

Coker et al., "Implementation of PRML in a Rigid Disk Drive," IBM Storage Systems Products Division Manuscript.

Goodenough, "DSP Technique Nearly Doubles Disk Capacity," *Electronic Design*, 53–57, Feb. 4, 1993.

Tuttle et al., "A 130Mb/s PRML Read/Write Channel with Digital–Servo Detection," IEEE International Solid–State Circuits Conference, Feb. 8, 1996.

Vanderkooy and Lipshitz, "Resolution Below the Least Significant Bit in Digital Systems with Dither," *J. Audio Eng. Soc.*, 32(3):106–113, 1984.

Welland et al., "A Digital Read/Write Channel with EEPR4 Detection," IEEE International Solid–State Circuits Conference, Feb. 18, 1994.

Welland et al., "Implementation of a Digital Read/Write Channel with EEPR4 Detection," Crystal Semiconductor and Cirrus Logic Manuscript.

*Primary Examiner*—Nabil Hindi
*Assistant Examiner*—Regina Y. Neal
*Attorney, Agent, or Firm*—Richard D. Egan; Dan Shifrin

[57] ABSTRACT

A circuit is provided for use with analog to digital conversion techniques in sampled amplitude read channel integrated circuits. A common ADC may be utilized for conversion of both high frequency disk data such as user data and servo data, for example, and for low frequency auxiliary data such as, for example, motor back-EMF current signals. The ADC may utilize the relatively low bit accuracy required for the read channel disk data and through oversampling techniques obtain sufficient conversion accuracy to meet the relatively higher precision requirements for the auxiliary data conversion. The auxiliary data is modified by a ramp signal and the ADC is run on a clock generated from a dithered frequency source so that ADC quantization errors may be randomized.

37 Claims, 5 Drawing Sheets

READ CHANNEL AUXILIARY HIGH PRECISION DATA CONVERSION

This application is a continuation-in-part of co-pending application Ser. No. 08/440,515 filed May 12, 1995, now U.S. Pat. No. 5,796,535 the disclosure of which is expressly incorporated herein by reference.

BACKGROUND OF THE INVENTION

The present invention relates to the control of magnetic storage systems for digital computers, and more particularly, to integrated circuits used for the analog to digital conversion of low frequency auxiliary signals used to control magnetic storage systems.

In magnetic disk storage systems for computers, such as hard disk drives, digital data serves to modulate the current in a read/write head coil so that a sequence of corresponding magnetic flux transitions are written onto a magnetic medium in concentric tracks. To read this recorded data, the read/write head passes over the magnetic medium and transduces the magnetic transmissions into pulses and an analog signal that alternates in polarity. These pulses are then decoded by read channel circuitry to reproduce the digital data.

Decoding the pulses into a digital sequence can be performed by a simple peak detector in a conventional analog read channel or, as in more recent designs, by using a discrete time sequence detector in a sampled amplitude read channel. Discrete time sequence detectors are preferred over simple analog pulse detectors because they compensate for intersymbol interference (ISI) and, therefore, are less susceptible to noise. As a result, discrete time sequence detectors increase the capacity and reliability of the storage system.

There are several well known discrete time sequence detection methods for use in a sampled amplitude read channel circuit including discrete time pulse detection (DPD), partial response (PR) with Viterbi detection, partial response maximum likelihood (PRML) sequence detection, decision-feedback equalization (DFE), enhanced decision-feedback equalization (EDFE), and fixed-delay tree-search with decision-feedback (FDTS/DF).

No matter what type of discrete methods are utilized for sampled amplitude read channel systems, an analog to digital converter (ADC) is typically utilized to convert the high frequency data which is contained on the disk. For example, the high frequency user data from a disk is often converted with a six-bit ADC. Other high frequency information which is contained on the disk, such as servo information, may also be detected and processed with the same ADC as utilized to convert user data from the disk. For example, co-pending U.S. application Ser. No. 08/440,515 filed May 8, 1995, now U.S. Pat. No. 5,796,535 discusses the use of a common ADC to convert both user data and servo data (collectively "disk data"). Typically such high frequency data is at frequencies of 50 MHz or higher, and more particularly of 100 MHz or higher.

Generally, in addition to data contained on the disk, disk drive systems also require the monitoring and use of various non-disk low frequency signals. Such low frequency signals may be called non-disk or auxiliary signals and include signals that indicate motor back-EMF current or other disk drive control signals for example. Typically, such auxiliary signals are analog signals which require conversion into digital signals for use in controlling and operating the disk drive system. Generally, such conversion is done through an additional ADC which is external to (i.e., not within) the read channel circuitry. Furthermore, the auxiliary control signals often require an ADC having a higher bit accuracy than the ADC which is utilized for the high frequency disk data. Typically the low frequency auxiliary control data is at frequencies of 100 KHz or lower, more particularly lower than 10 KHz, and for example 3 KHz as used with motor back-emf signals.

A block diagram of a typical prior art system showing the use of multiple ADC's is shown in FIG. 1. As shown in FIG. 1, high frequency disk data, such as user data and servo data, is presented at an input 10. The input 10 provides data to a read channel circuitry 30. Within the read channel circuitry 30 an ADC 40 is utilized. The digital version of the analog data from input 10 is provided at an output 20. It will be recognized by those skilled in the art that the digital data at output 20 may then be used and process by other portions of a typical read channel circuit (not shown). Independent of the read channel circuitry 30, auxiliary conversion circuitry 70 is also utilized in the prior art. In such prior art uses, the auxiliary conversion circuitry 70 is external to the read channel circuitry 30. Auxiliary data, for example low frequency motor back-EMF current data, is presented at auxiliary data input 50. Through the use of an ADC 80 within the auxiliary conversion circuitry 70, a digital form of the analog data presented at input 50 is provided at output 60.

Within the prior art, the ADC utilized in the read channel circuitry generally has a lower precision than the ADC utilized in the auxiliary conversion circuitry. For example the ADC 40 in the read channel circuitry 30 typically has six bit accuracy while the auxiliary conversion ADC typically requires 8 to 10 bit accuracy. The use of two separate ADC circuits adds complexity, circuit size and circuit costs to the control electronics for disk drive systems. However, the prior art utilization of two separate ADC's has been required as a result of the significantly different uses and specifications of each ADC. For example, ADC 40 utilized in the read channel receives relatively high frequency data and uses a relatively low precision circuitry while ADC 80 receives relatively low frequency data and requires relatively high precision ADC circuitry. It would be desirable to reduce the disk drive circuitry complexity, size, and costs of the ADC methods utilized in the prior art disk drive systems.

SUMMARY OF THE INVENTION

The present invention addresses the problems described above. More particularly, the present invention provides a method and apparatus for using the existing low precision ADC present in the read channel circuitry to also perform the analog to digital conversions necessary for low frequency auxiliary data such as motor back-EMF current data. Furthermore, the present invention provides a circuit in which the low frequency auxiliary data may be converted with an ADC which only has the relatively low bit accuracy required for the read channel disk data ADC. By utilizing oversampling techniques, sufficient analog to digital conversion is still obtained even though a relatively lower precision ADC is utilized. Thus, circuit complexity, size and costs may be diminished.

More particularly, the present invention provides a conversion method in which the auxiliary data is subjected to amplitude dither which will provide multiple samples with randomly distributed quantization errors. The present invention also provides a method to use timing dither in the sampling of the auxiliary input to increase the randomness of the quantization errors.

In one embodiment, the present invention includes a sampled amplitude read channel integrated circuit for reading data from a magnetic disk medium and for sampling both disk data and auxiliary data (the auxiliary data not contained on the disk). The read channel integrated circuit may include a disk data input for providing analog disk data, an auxiliary data input for providing analog auxiliary data, and an analog to digital converter coupled to both the disk data input and the auxiliary data input in which the analog to digital converter is capable of converting both the disk data and the auxiliary data.

In another embodiment the present invention includes a method for converting auxiliary analog data in a read channel circuit wherein the auxiliary analog data is non-disk data. The method may include providing an analog to digital converter which is connected to process read channel disk data, receiving at an input to the analog to digital converter data reflecting the auxiliary analog data, and converting the auxiliary data with the analog to digital converter to obtain digital data indicative of the auxiliary analog data.

DETAILED DESCRIPTION OF THE PREFERRED EMBODIMENTS

In accordance with the present invention it has been recognized that a common ADC may be utilized to perform the analog to digital conversions required for both the high frequency disk data and the low frequency auxiliary data. Oversampling techniques may be utilized to aid in the implementation of the common ADC.

Typical oversampling techniques recognize that the ADC quantization error changes randomly from $$+\frac{\Delta}{2} \text{ to } -\frac{\Delta}{2}$$

if the analog input changes randomly (wherein $\Delta$ is the precision of the ADC). Thus, the quantization error may be approximated as white noise and has a uniform power spectral density of $$\left(\frac{\Delta^2}{12}\right)\left(\frac{1}{f_s}\right)$$

in the range of $+f_s/2$ to $-f_s/2$ where $f_s$ is the sampling frequency. For a random quantization error and an analog signal oversampled by a given oversampling ratio (OSR) (where OSR x $f_s$ is the new sampling frequency) the new power spectral density of the quantization error is $$\left(\frac{\Delta^2}{12}\right)\frac{1}{(f_s \cdot OSR)}$$

(a change of a factor of $$\frac{1}{OSR}$$

. Thus each doubling of the OSR reduces the r.m.s. quantization error by 3 dB.

In an example implementation of the present invention a 6 bit ADC may be utilized. In order to provide sufficient range for amplitude dither, only half of the input range is used for auxiliary input and the other half of the ADC input range is used for the amplitude dither. Thus, an input resolution of only 5 bits is provided. According to the present invention, oversampling techniques may be implemented for the auxiliary data to improve the 5 bit accuracy to 8.5 bit accuracy (an improvement of 3.5 bits) which requires a 21dB gain in OSR. Thus, an OSR of 128, i.e., 2**7 samples are required to implement the 8.5 bit accuracy using the 6 bit ADC. It will be recognized by those skilled in the art that the bit accuracies given herein are illustrative and that other design implementations of the present invention may use circuitry having more or less accurate bit resolution.

Figure 2:
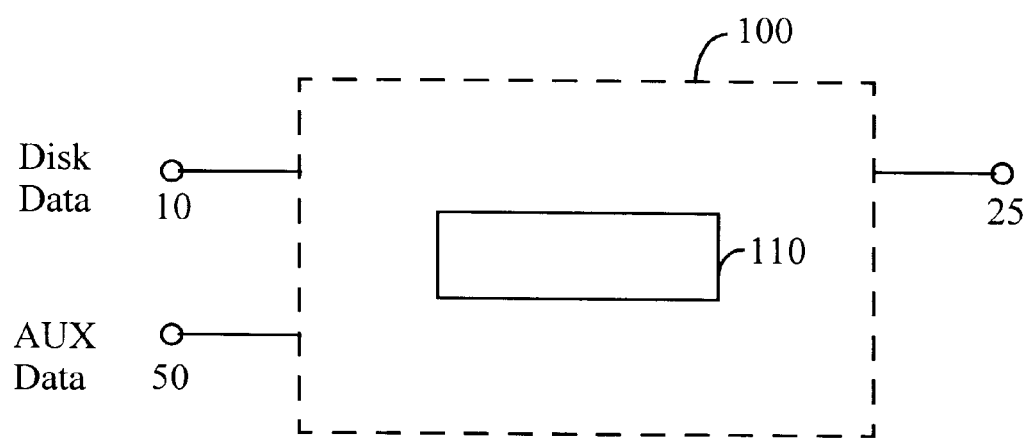
FIG. 2 is an overview block diagram of the ADC requirements of a sampled amplitude read channel integrated circuit according to the present invention.

A generalized block diagram of one embodiment of the present invention is shown within FIG. 2. As shown in FIG. 2, a sampled amplitude read channel integrated circuit 100 is utilized for the analog to digital conversion of both disk data and auxiliary data. Furthermore, the circuit 100 utilizes conversion circuitry 110 which employs a single ADC for conversion of both disk data and auxiliary data. The conversion circuitry 110 includes the ADC and its related implementation circuitry as shown in more detail in FIGS. 3–6. Within FIG. 2, high frequency disk data may be presented at the disk data input 10, processed through conversion circuitry 110, and provided as an output at output 25. Furthermore, low frequency auxiliary data may be provided at auxiliary data input 50 and also processed through the conversion circuitry 110 to provide a digital output at output 25. In a preferred embodiment, the auxiliary data may be data reflecting a disk drive system motor back-EMF current which a disk drive system may utilize within system control loops. Moreover, in a preferred embodiment ADC 110 may be a 6 bit ADC. Circuitry 110 includes oversampling circuitry such that sufficient analog to digital conversion may be obtained for the low frequency auxiliary data even though only a 6 bit ADC circuit is utilized.

Figure 3:
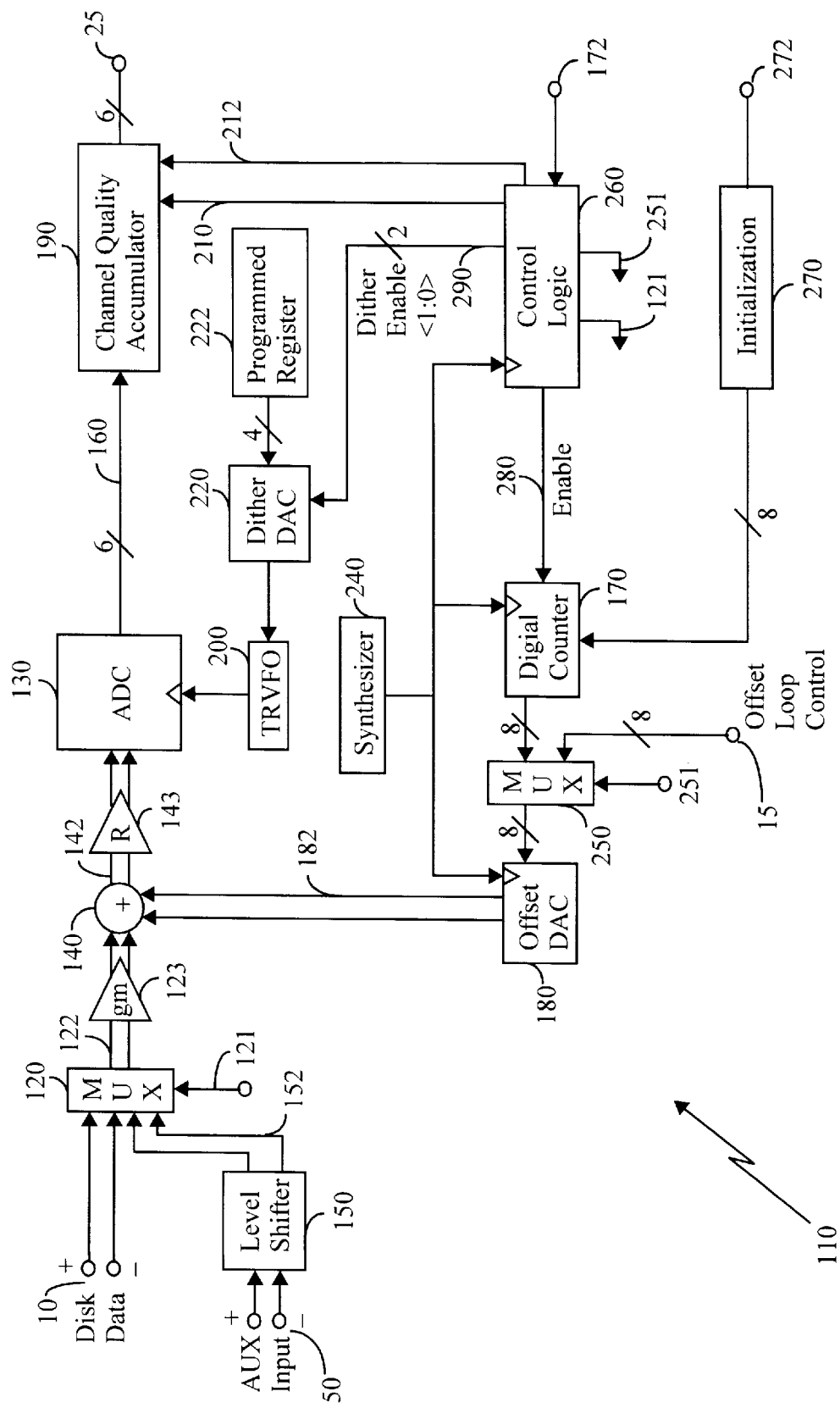
FIG. 3 is a block diagram of one embodiment of an ADC system for read channel circuit according to the present invention.
Figure 5:
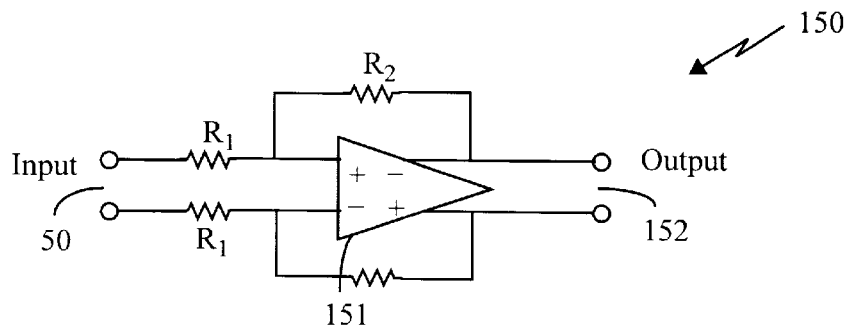
FIG. 5 is a circuit diagram of one embodiment of a level shifter for use in the block diagram of FIG. 3.
Figure 6:
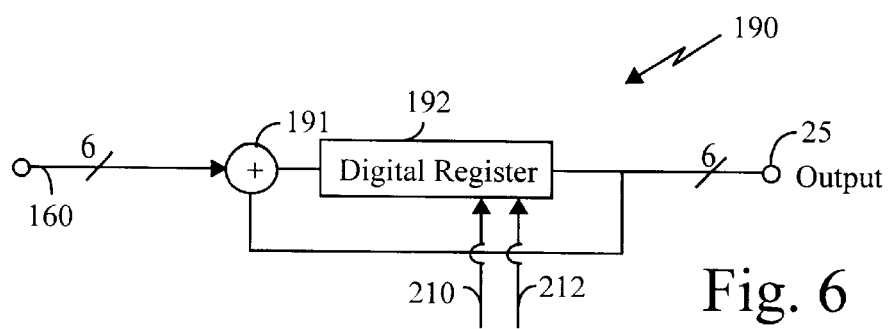
FIG. 6 is a circuit diagram of one embodiment of a channel accumulator for use in the block diagram of FIG. 3.

FIG. 3 is a block diagram of the conversion circuitry 110. As shown in FIG. 3, the conversion circuit 110 receives disk data inputs at inputs 10 and auxiliary inputs at inputs 50. The Auxiliary input data at inputs 50 may be provided to a level shifter circuit 150. For example, the auxiliary data may be at a 3 Volts peak to peak differential (ppd) level and the level shifter 150 may be utilized to shift the voltage to a 320 mV ppd level. Other input and operating levels may also be utilized as a matter of design choice. The level shifting circuit may be an amplifier with fixed gain that achieves the desired level change. Alternatively, the auxiliary data may already be at the desired voltage level or may be shifted to the desired level outside of the conversion circuitry 110, and thus, level shifter 150 may not be necessary for the conversion circuitry 110. FIG. 5 shows one example level shifter 150 in which a high gain amplifier 151 may be utilize to provide the outputs 152 from the inputs 150.

The auxiliary data (at the output lines 152 of the level shifter 150) and the disk data are connected to a mux 120. Mux 120 selects either disk data or auxiliary data for processing through the conversion circuitry 110. The outputs 122 of the mux 120 may be, for example, voltage outputs and stage 123 may be utilized as a voltage to current converter. The outputs of stage 123 may then be provided to an adder 140 which in turn is connected to a stage 143. Stage 143 may be utilized as a current to voltage converter, thus providing voltage inputs to the ADC 130. It will be recognized that the signals utilized herein may be added in either a voltage or current mode. As utilized hereinafter, the outputs 122 of the mux 120 will simply be referred to as connected to the adder 140 and likewise the outputs of the mux 142 will be referred to as connected to the ADC 130. However, it will be recognized that the intervening stages 123 and 143 may be present so that the adding of signals 122 and 182 may be either a voltage or current addition as desired.

When the conversion circuitry 110 is operating in a disk data mode, the data on the outputs 142 of the adder 140 will be the disk data present at on lines 122 as adjusted (if desired) by the output of an offset DAC 180. When the conversion circuitry 110 is operating in a disk data mode, the desired offset (if any) is provided from an offset loop control input 15 through a mux 250 to the offset DAC 180. The offset loop control signal may be provided from standard read channel circuitry to compensate for offsets that may exist in the disk data input signals. However as will be described below, when operating in an auxiliary conversion mode, the auxiliary data on lines 122 will be conditioned by adding to the auxiliary data offset generated from a digital counter to thus provide the conditioned auxiliary data on lines 142. The data on lines 142 is then provided as an input the ADC 130.

Figure 4:
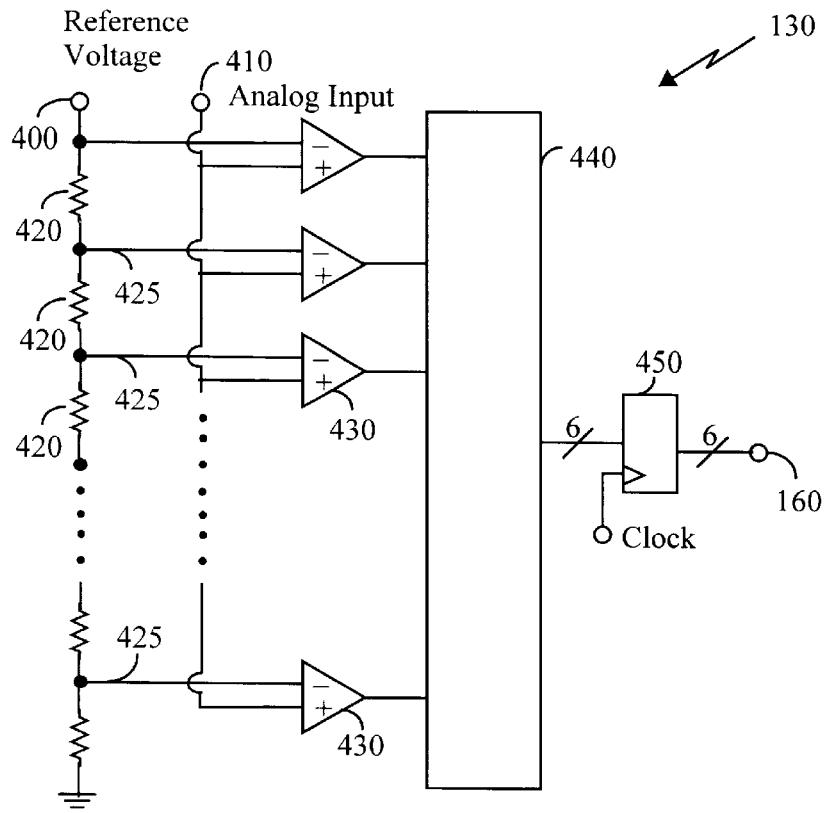
FIG. 4 is a circuit diagram of one embodiment of an ADC for use in the block diagram of FIG. 3.

The ADC 130 may be any analog to digital converter circuit. In one embodiment, the ADC 130 may be a 6 bit flash ADC. An ADC example of this embodiment is shown in FIG. 4. The ADC 130 of the embodiment of FIG. 4 may include an analog input 410 and a reference voltage input 400. The reference voltage is then divided into separate voltages through a series of resistors 420 which form a resistor voltage divider. Output taps are then provided from the resistor voltage divider to provide reference voltage inputs 425 to a series of comparators 430. In one embodiment, 64 separate voltages may be provided through 64 resistors 420 (each voltage varying by 1/64 of the reference voltage from the adjacent resistor) to 64 comparators 430. The analog input which is to be converted to a digital value is provided through input 410 to each of the comparators 430. The outputs of the comparators 430 are then provided to digital logic 440. By observing the outputs of the comparators 430, the digital logic 440 determines which two reference voltages the analog input lies between and provides a 6 bit digital representation of that voltage. The 6 bit output may is then provided at output 160 through a clocked D flip-flop 450.

Returning to FIG. 3, the auxiliary data is conditioned prior to being provided to the ADC 130. In particular, the circuitry shown in FIG. 3 supplies amplitude dither to the auxiliary data through the use of a digital counter 170, offset digital to analog converter (DAC) 180, control logic 260, a synthesizer 240, a dither DAC 220 and a variable frequency oscillator (VFO) 200. In one embodiment, the synthesizer 240 may be a digitally programmable synthesizer set to a frequency of 100 Mhz.

It has been recognized that auxiliary data may be converted to a bit accuracy higher than the bit accuracy of ADC 130 due to the assumption that the ADC samples may have random quantization errors. Thus by averaging over a number of samples, the effective quantization error can be reduced since the average value of a random distribution centered around zero will tend toward zero. This is performed by utilizing a digital counter 170 which drives the offset DAC 180 to add a slow triangular wave to the auxiliary input signal through the adder 140 when operating in the auxiliary conversion mode. The digital counter 170 acts as an up-down counter. The output 174 of the digital counter 170 provides a digital triangular wave that drives the offset DAC 180. The output 182 of the offset DAC is an analog triangular wave that is added to the auxiliary input signal by utilizing adder 140. Thus, at the output of the adder 140 the auxiliary signal appears to be dithered in amplitude. In the present invention, in order to prevent the dithered signal from being limited by the ADC range, the auxiliary input is limited to only half the ADC input range. The triangular dither is also chosen to be half the ADC input range in peak to peak amplitude. This utilizes the full ADC input range for both the auxiliary input and the amplitude dither that is added to it.

The present invention is not limited to methods of conditioning the auxiliary data by use of a triangular wave. It is merely desirable for the average value of the conditioning signal to be zero so that the average value of the input to the ADC is just the level-shifted auxiliary input value. By using the triangular wave, the different ADC output codes (which may each have different quantization errors) are each exercised. Thus, the average value of the input to the ADC is obtained by averaging out over a large number of quantization errors. Alternatively, the average value of the conditioning signal could be offset from zero as long as the offset is known and can be subtracted from the ADC result. Further, the dither DAC and the VFO may be replaced by a synthesizer which is digitally programmed to operate at a frequency that is slightly offset from the operating frequency of the synthesizer 240.

Figure 7A:
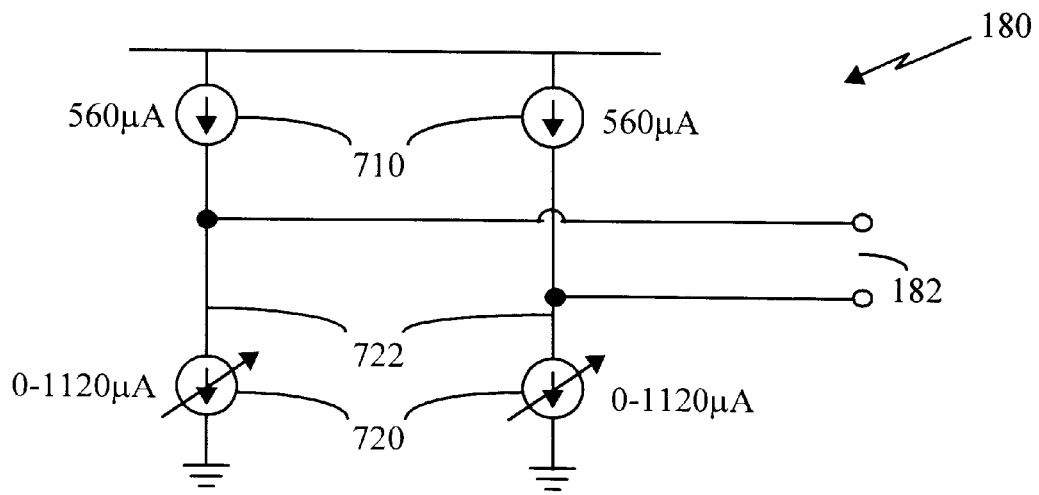
FIGS. 7A–B are circuit diagrams of an example offset DAC for use in the block diagram of FIG. 3.

As shown in FIG. 3, in one embodiment the digital counter has an 8 bit output, though other counters may be used. Further, in general any DAC may be utilized for the offset DAC 180. In one embodiment, the offset DAC 180 may be a binary weighted DAC. One example of a binary weighted DAC may be seen with reference to FIGS. 7A and 7B, though other DACs and other types of binary weighted DACs may be utilized. As shown in FIG. 7A, the DAC 180 includes two current sources 710 and two variable current sources 720. The current through the variable current sources 720 varies in response to the eight digital inputs to the DAC to provide the desired analog current at outputs 182. In the example shown, the current sources 710 may operate at 560 uA and the variable current sources may operate from 0 to 1120 uA.

Figure 7B:
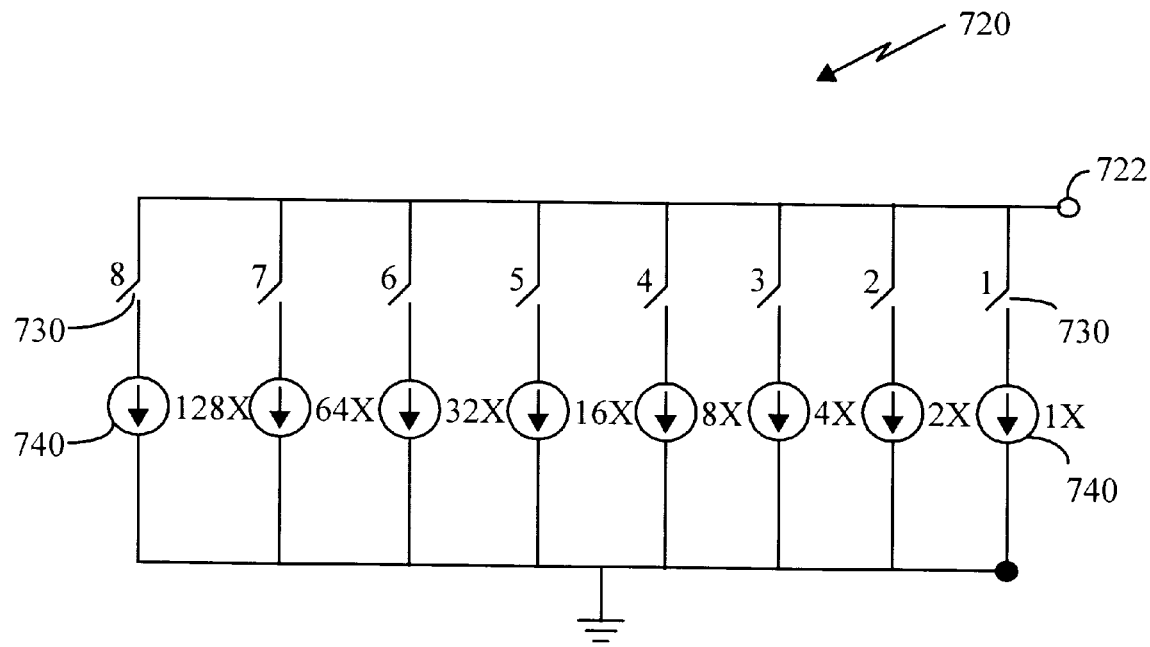

An example variable current source 720 is shown in FIG. 7B. As shown in FIG. 7B, the each of the eight digital input bits controls a switch 730 (labeled switches 1–8 respectively). Each switch is connected to a constant current source which varies in magnitude by 1×, 4×, 8×, . . . 128× as shown. Thus, the digital inputs will set the current through lines 722 and result in the analog current signal at lines DAC output lines 182.

Because the digital up-down counter 170 is periodic, it is possible that the quantization errors resulting from the use of the digital counter and the offset DAC 180 may not be random. Thus, to ensure a random nature of the quantization error is desirable to obtain a random relationship between the amplitude signal that is superposed on the analog input and the clock which is used to drive the ADC 130. To help ensure random quantization errors and avoid a systematic quantization error, separate clocks may be utilized. One clock may be used to drive the offset DAC 180 and the digital counter 170. Another clock may be used to drive the ADC 130.

To accomplish such a relationship, the ADC is run on a clock generated from a VFO whose frequency is dithered around or offset from a nominal frequency while the offset DAC, digital counter 170, and control logic 260 are controlled by a fixed frequency clock (synthesizer 240). The VFO 200 provides the dithered clock under control of a DAC 220. To adjust the frequency of the VFO 200, the dither DAC 220 provides an output which is utilized as an input to the VFO 200 in order to vary the frequency of the VFO 200. The dither DAC 220 is controlled by control logic 260 and a programmable register 222. The programmable register 222 controls how much the frequency of the VFO is shifted from its nominal value when dither is enabled.

The dither DAC may include 3 modes of operation. During a read channel mode of operation, the dither enable signal disables the dither output, this may occur, for example, when the dither enable signal is 00. When auxiliary conversion is enabled, the dither enable signal changes to 10, which enables the dither DAC to move the VFO frequency up from its nominal value by the quantity programmed in the register 222. This positive dither proceeds for approximately half of the conversion time. After the positive dither is completed, the control logic 260 changes the dither enable signal to 01, which represents negative dither. The VFO is then moved down from its nominal frequency by the programmed quantity. After auxiliary conversion is completed, the dither enable signal may then be returned to 00 at which point the dither DAC is disabled and the VFO returns to its nominal frequency.

In the example circuit of FIG. 3, the programmable register 222 may be a four bit register which may provide a four bit number from 0000 to 1111 to the dither DAC 220. Each digital number corresponds to a 0.4% frequency shift from its previous number, thus allowing at least 6.4% frequency variations in increments of 0.4%. In a preferred embodiment, a single value is loaded into the register for use during both the positive and negative dither. It is contemplated that 2–3% dither would be utilized, however, more or less dither may be sufficient. Because the register 222 is programmable, different values of the frequency shift may be characterized and the value selected to provide the optimal system performance. Alternatively, rather than the programmable example shown in FIG. 3, a circuit having a set frequency that has a different frequency from the synthesizer 240 may be utilized for controlling the ADC during auxiliary conversion.

The dither DAC is used to change the VFO frequency from its nominal value, which is the synthesizer frequency. Both positive and negative dither may be employed. Positive dither moves the frequency of the VFO up from the nominal frequency by the programmed quantity and negative dither moves it down from the nominal frequency by the programmed quantity. In one embodiment, the positive dither may be used for half of the auxiliary conversion samples and negative dither for the other half. This would help in returning the sampling phase to the original starting point, and thus, bring the average value of the amplitude dither close to zero.

Thus, the frequency of the VFO 200 may be moved from its center frequency by a programmed quantity. In one embodiment, the frequency may be moved (in increments of 0.4%) by up to 6.4% from a center frequency of 100 MHz. In positive dither, the VFO's frequency is increased by the programmed quantity and in negative dither the VFO's frequency is decreased by the same quantity. The auxiliary conversion is carried out for a fixed quantity of time (for example 128 sampled periods) and for half this time positive dither is employed and for the second half of the time negative dither is employed. Thus, at the end of the auxiliary conversion, the phase of sampling returns to close to the original value, reducing the conversion error.

Figure 1:
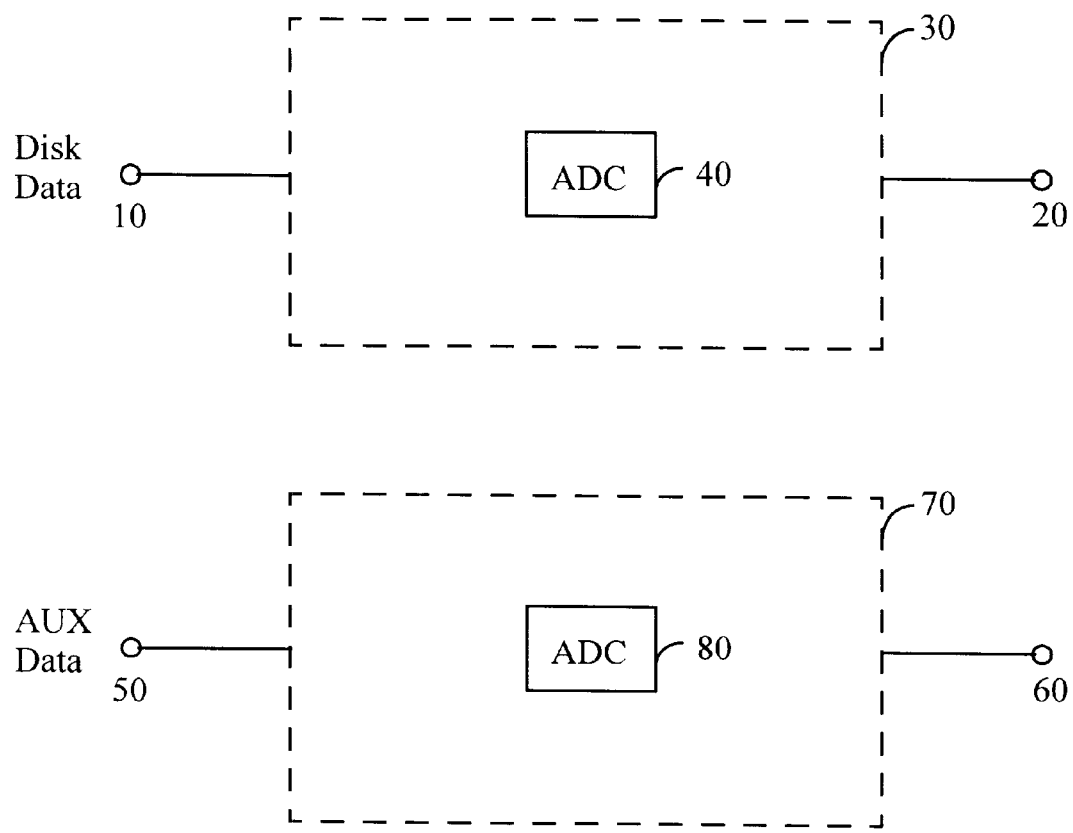
FIG. 1 is an overview block diagram of the ADC requirements of typical prior art sampled amplitude read channel system.

Though FIG. 1 shows one preferred embodiment, it will be recognized that any two oscillators or synthesizers may be utilized in any manner which results in non-correlated quantization errors. In particularly, the frequencies may be chosen to have an offset to limit the relationship between the two frequencies utilized.

In order to address random offsets which may be present in the converting sequence, an initialization register 270 may provide control signals to zero out random offsets. This may be accomplished by writing offset values to the register 270 through an input 272 to initialize the digital counter 170 to move the DC offset value of the auxiliary data conversion process so as to center the ADC transfer function.

The six bit wide output of ADC 130 is provided on bus 160 to a channel quality accumulator 190. The channel quality accumulator 190 performs an adding function. In the read channel disk mode, the accumulator may by used to accumulate various digital signals. For example, it may be used to add read channel gain error detector outputs, read channel phase error detector outputs, bit errors detected in the channel bits, etc. In the auxiliary conversion mode according to the present invention, the accumulator 190 simply adds all the ADC outputs at ADC output 160 for the time duration at which auxiliary conversion is carried out. The accumulator 190 may be seen with more detail in FIG. 6. As shown in the Figure, the accumulator receives ADC output data on lines 160, stores data in register 192, and adds the additional data through adder 191 to provide the output 25.

The digital counter 170, dither DAC 220, and channel quality accumulator 190 are controlled by control logic 160. The control logic 160 receives an input 172 which indicates whether the auxiliary conversion mode is desired. If auxiliary conversion is selected, then the control logic provides control signals 121, 210, 212, 251, 280, and 290 as shown.

More particularly, when the input signal 172 of the control logic 160 is asserted, the control logic switches the muxes 120 and 250 through control signals 121 and 251 so that the muxes provide as outputs the outputs of the level shifter 150 and the digital counter 170 respectively. Thus, the system is configured to carry out the auxiliary conversion. Through enable signal 280, the control logic 160 also enables the digital counter 170 to start the triangular wave signal (which may be offset by the initialization register 270). The dither enable signal 290 is asserted by the control logic to be positive for half the conversion time and negative for the second half. The channel quality accumulator is reset by a reset signal 212 which clears the register of the accumulator. The channel quality accumulator is enabled by enable signal 210 and accumulation proceeds during the time that the signal 210 is enabled. The ADC output is accumulated for the period (multiples of 128 samples) in which signal 210 is asserted. The accumulation length is determined by the approximate time the input signal 172 is asserted. When accumulation takes place for more than 128 samples, the dither dac periodically switches from positive to negative dither and vice-versa every 64 samples while the digital counter continues to generate the triangular ramp function.

Thus, as may be seen from the Figures, a circuit has been provided such that a common ADC 130 may be utilized in the converting sequence for both high frequency disk data (for example disk user data and servo data) and for low frequency auxiliary data. As shown in the figures, the auxiliary data may be provided at an input 50 in which the input signal is applied at the positive auxiliary pin and a common mode (or reference signal) supplied to the negative signal. Greater ADC precision is achieved for the auxiliary data by averaging over the quantization error of the ADC 130 using oversampling techniques. This is performed by utilizing a digital counter 170 which drives the offset DAC 180 to add a slow triangular wave to the input signal.

In a preferred example, the nominal frequency of the triangular wave may be $f_s/256$, where $f_s$ is the nominal sampling frequency. The input to the ADC is now thus a triangular wave that is offset from common mode by the value of the analog input. This modified signal is then sampled by the ADC which is clocked at a frequency dithered from its nominal frequency by programmable quantity. In one embodiment, the ADC sampling frequency may be shifted up from the center frequency (positive dither) for half the sampling window and shifted down from the center frequency (negative dither) for the second half of the sampling window. The length of the sampling window is controlled by the digital counter input signal 172 in increments of 128 accumulated samples. The purpose of the dither is to sample different points on the triangular waveform so as to randomize the quantization error introduced by the ADC sufficiently to achieve 10 bit resolution of the accumulated output in the channel quality accumulator 190. The triangular waveform can be offset from 0 average value by the initiation register 270 to accommodate for any system offset. Since only half of the ADC input range for the auxiliary input is used, effectively 5 bit resolution of the auxiliary input is provided. For random quantization errors in 128 samples, the rms quantization error may reduce by 21 dB, which will give an additional 3.5 bits of resolution. Thus, 8.5 bit resolution may be obtained even though a 6 bit ADC 130 is used. Higher resolutions may be obtained by accumulating more samples in each auxiliary conversion.

One embodiment to initiate the auxiliary conversion process is described below. To start the auxiliary conversion, signal 172 is asserted. The synthesizer, which is programmed to operate at 100 MHz, should be allowed to settle. This should be followed by a lock-to-reference operation to center the VFO frequency to that of the synthesizer. The channel quality accumulator should be reset. Asserting the counter input 280 initiates the digital counter. The digital output is then stored in the channel quality accumulator.

Further modifications and alternative embodiments of this invention will be apparent to those skilled in the art in view of this description. For example, arrangement and types of circuits shown herein are generally one embodiment of a circuit to implement the present invention. However, it will be recognized that conceptually the present invention may be implemented with a wide range of other circuitry. Accordingly, this description is to be construed as illustrative only and is for the purpose of teaching those skilled in the art the manner of carrying out the invention. It is to be understood that the forms of the invention herein shown and described are to be taken as merely embodiments. Various changes may be made in the arrangement and types of components or devices. For example, equivalent elements or materials may be substituted for those illustrated and described herein, and certain features of the invention may be utilized independently of the use of other features, all as would be apparent to one skilled in the art after having the benefit of this description of the invention.

What is claimed is:

1. A sampled amplitude read channel integrated circuit for reading data from a magnetic disk medium and for sampling both disk data and auxiliary data, said auxiliary data not contained on said disk, comprising:

a disk data input for providing high frequency analog disk data, the high frequency analog disk data being at frequencies of about 50 MHz or greater;

an auxiliary data input for providing low frequency analog auxiliary data, said auxiliary data not contained on said disk; and an analog to digital converter coupled to both said disk data input and said auxiliary data input, said analog to digital converter capable of converting both said disk data and said auxiliary data, wherein said low frequency analog auxiliary data is converted to digital data at a greater precision than the bit accuracy of said analog to digital converter so that a conversion accuracy for conversion of said low frequency analog auxiliary data is greater than a conversion accuracy for conversion of said high frequency analog disk data.

2. The sampled amplitude read channel integrated circuit of claim 1 wherein said auxiliary data is motor back-EMF current data.

3. A sampled amplitude read channel integrated circuit for reading data from a magnetic disk medium and for sampling both disk data and auxiliary data, said auxiliary data not contained on said disk, comprising:

a disk data input for providing high frequency analog disk data, the high frequency analog disk data being at frequencies of about 50 MHz or greater;

an auxiliary data input for providing low frequency analog auxiliary data, said auxiliary data not contained on said disk; and an analog to digital converter coupled to both said disk data input and said auxiliary data input, said analog to digital converter capable of converting both said disk data and said auxiliary data, wherein said auxiliary data is conditioned to enable oversampling of said auxiliary data with said analog to digital converter so that a conversion accuracy for conversion of said low frequency analog auxiliary data is greater than a conversion accuracy for conversion of said high frequency analog disk data.

4. The sampled amplitude read channel integrated circuit of claim 3, further comprising an amplitude dither source coupled to said auxiliary data input wherein said auxiliary data may be modified by said dither source.

5. The sampled amplitude read channel integrated circuit of claim 4, said amplitude dither source comprising an analog triangular wave signal source.

6. The sampled amplitude read channel integrated circuit of claim 5, said triangular wave source comprising a digital counter and a digital to analog converter for converting an output of said counter to an analog signal.

7. The sampled amplitude read channel integrated circuit of claim 4, further comprising a first clock connected to said amplitude dither source and a second clock connected to said analog to digital converter.

8. The sampled amplitude read channel integrated circuit of claim 7, a frequency of said second clock being different from a frequency of said first clock.

9. The sampled amplitude read channel integrated circuit of claim 7, said second clock being a variable frequency clock connected to a dither source to adjust said frequency about a nominal frequency.

10. A method for converting low frequency auxiliary analog data in a read channel integrated circuit, wherein said low frequency auxiliary analog data is non-disk data, comprising:
   providing an analog to digital converter, said analog to digital converter connected to process read channel high frequency disk data, the high frequency disk data being at frequencies of about 50 MHz or greater;
   receiving at an input to said analog to digital converter data reflecting said low frequency auxiliary analog data; and
   converting said data with said analog to digital converter to obtain digital data indicative of said low frequency auxiliary analog data,
wherein a conversion accuracy for conversion of said low frequency auxiliary analog data is greater than a conversion accuracy for conversion of said high frequency disk data.

11. The method of claim 10 wherein said auxiliary analog data is motor back-EMF current data.

12. A method for converting low frequency auxiliary analog data in a read channel integrated circuit, wherein said low frequency auxiliary analog data is non-disk data, comprising:
   providing an analog to digital converter, said analog to digital converter connected to process read channel high frequency disk data, the high frequency disk data being at frequencies of about 50 MHz or greater;
   receiving at an input to said analog to digital converter data reflecting said low frequency auxiliary analog data;
   converting said data with said analog to digital converter to obtain digital data indicative of said low frequency auxiliary analog data; and
oversampling said auxiliary analog data so that a conversion accuracy for conversion of said low frequency auxiliary analog data is greater than a conversion accuracy for conversion of said high frequency disk data.

13. The method of claim 12, further comprising:
   conditioning said auxiliary analog data to randomly distribute quantization errors of said auxiliary analog data.

14. The method of claim 12, further comprising:
   adding an analog signal to said auxiliary analog data prior to said converting step.

15. The method of claim 14 wherein said adding step dithers an amplitude of said auxiliary analog data.

16. The method of claim 15, further comprising generating said analog signal from a digital to analog converter driven by a digital triangular wave signal.

17. The method of claim 16 further comprising:
   driving said analog to digital converter with a first clock; and
   driving said analog to digital converter with a second clock, wherein said first clock may operate at a first frequency and said second clock may operate at a second frequency, said first frequency different from said second frequency.

18. The method of claim 17 wherein said second clock is a variable frequency oscillator.

19. The method of claim 16 wherein the frequency of said variable frequency oscillator is varied about a nominal frequency.

20. The method of claim 14 further comprising:
   driving said analog to digital converter with a first clock; and
   providing said analog signal at a frequency of a second clock, wherein said first clock may operate at a frequency different from said second clock.

21. A read channel integrated circuit comprising:
   a high frequency analog data input;
   a low frequency analog data input;
   an analog to digital converter connected to both said high frequency data input and said low frequency data input; and
   signal conditioning circuitry connected between said low frequency data input and said analog to digital converter,
wherein low frequency data at said low frequency data input is converted to digital data at a greater precision than the bit accuracy of said analog to digital converter wherein a conversion accuracy for conversion of said low frequency data is greater than a conversion accuracy for conversion of high frequency data at said high frequency data input.

22. The read channel integrated circuit of claim 21 wherein said low frequency data input is a motor back-emf current input.

23. The read channel integrated circuit of claim 21 said signal conditioning circuitry providing oversampling of low frequency data at said low frequency data input.

24. The read channel integrated circuit of claim 23 said conditioning circuitry comprising a signal source and an adder for combining said a conditioning signal and said low frequency data.

25. The read channel integrated circuit of claim 24, said conditioning signal being a triangular wave signal.

26. The read channel integrated circuit of claim 25, further comprising:
   a first clock source for controlling said signal source; and
   a second clock source for controlling said analog to digital converter, said first and second clocks being operable at different frequencies.

27. The read channel integrated circuit of claim 26 wherein said first and second clocks operate at frequencies sufficiently different to randomize sampling errors.

28. The read channel integrated circuit of claim 26, said second clock having a variable frequency.

29. The read channel integrated circuit of claim 26 wherein said first and second clocks operate at frequencies sufficiently different to randomize a relationship between said conditioning signal and said low frequency data.

30. The read channel integrated circuit of claim 23, further comprising:
   a first clock source for controlling said conditioning circuitry; and
   a second clock source for controlling said analog to digital converter, said first and second clocks being operable at different frequencies.

31. A method for operating a read channel integrated circuit, comprising:
   receiving high frequency disk data at a first input;
   receiving low frequency auxiliary data at a second input;
   processing said disk data and said auxiliary data with a same analog to digital converter to convert said disk data and said auxiliary data to digital data; and obtaining a greater conversion accuracy for conversion of said low frequency auxiliary data than a bit accuracy of said analog to digital converter wherein a conversion accuracy for conversion of said low frequency auxiliary data is greater than a conversion accuracy for conversion of said high frequency disk data.

32. The method of claim 31 wherein said conversion accuracy for conversion of said auxiliary data is greater than a conversion accuracy for conversion of said disk data.

33. The method of claim 31, further comprising:
conditioning said auxiliary data prior to said processing step.

34. The method of claim 33 wherein said conditioning step comprises oversampling said auxiliary data.

35. The method of claim 33 wherein said conditioning step is performed at a first frequency and said processing step is performed at a second frequency, said first and second frequencies being different.

36. The method of claim 35 wherein an average of said first frequency equals an average of said second frequency.

37. The method of claim 35 wherein said second frequency is variable.

* * * * *

UNITED STATES PATENT AND TRADEMARK OFFICE
CERTIFICATE OF CORRECTION

PATENT NO. : 6,078,444
DATED : June 20, 2000
INVENTOR(S) : Vishakhadatta, et al.

It is certified that error appears in the above-identified patent and that said Letters Patent is hereby corrected as shown below:

In Claim 19, column 12, line 3, delete " 16" and insert --18--.

In Claim 21, column 12, line 13, after " input" insert --,the high frequency being frequencies of about 50 MHz or greater--.

In Claim 31, column 12, line 63, after " input" insert --,the high frequency disk data being at frequencies of about 50 MHz or greater--.

Signed and Sealed this

Third Day of April, 2001

Attest:

NICHOLAS P. GODICI

Attesting Officer

Acting Director of the United States Patent and Trademark Office